United States Patent [19]

Ohya et al.

[11] 4,357,781
[45] Nov. 9, 1982

[54] REAR SIDE DOOR STRUCTURE FOR FOUR-DOOR TYPE AUTOMOBILES

[75] Inventors: Takeji Ohya; Tatuo Maeda, both of Hiroshima, Japan

[73] Assignee: Toyo Kogyo Co., Ltd., Hiroshima, Japan

[21] Appl. No.: 168,787

[22] Filed: Jul. 14, 1980

[30] Foreign Application Priority Data

Jul. 14, 1979 [JP] Japan .............................. 54/96906[U]
Jul. 16, 1979 [JP] Japan .............................. 54/98689[U]
Aug. 31, 1979 [JP] Japan .......................... 54/121176[U]

[51] Int. Cl.³ ........................................... E05F 11/52
[52] U.S. Cl. ........................................ 49/227; 49/374; 49/376
[58] Field of Search ................. 49/227, 372, 374, 375, 49/376, 348

[56] References Cited

U.S. PATENT DOCUMENTS 1,778,025 10/1930 Du Pont ........................... 49/227 X
2,746,747  5/1956 Lautenbach ........................ 49/227

FOREIGN PATENT DOCUMENTS 52-158417 12/1977 Japan .
53-16221  2/1978 Japan .
53-67217  6/1978 Japan .
868658  5/1961 United Kingdom ................... 49/375

*Primary Examiner*—Kenneth Downey
*Attorney, Agent, or Firm*—Fleit & Jacobson

[57] ABSTRACT

A rear side door structure for four-door type automobiles including a rear door panel having an upper hem which defines a lower edge of a window opening, a guide member extending upwardly from the upper hem of the door panel to divide the window opening into a front opening portion and rear opening portion, a front glass panel fitted to the front opening portion, a rear glass panel disposed in the rear opening portion for movement along the guide member. The guide member is inclined rearwardly so that the rear glass panel is shifted forwardly when it is moved downwardly. According to this arrangement, the rear glass panel can be retracted into the door panel without any interference with the cut-off portion which is normally provided in the door panel at the rear lower portion for avoiding the rear tire house.

7 Claims, 20 Drawing Figures

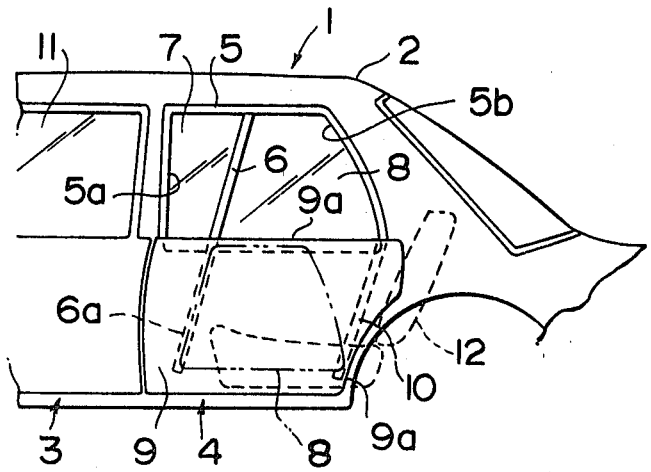
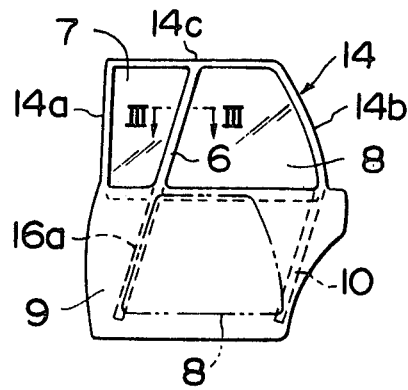
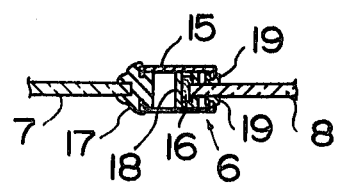
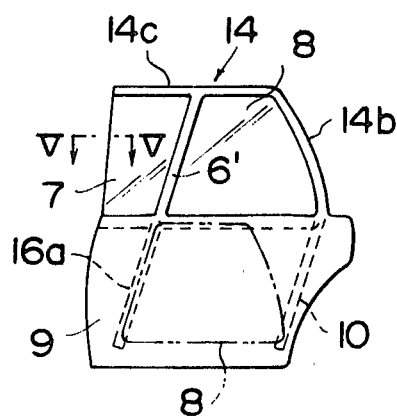
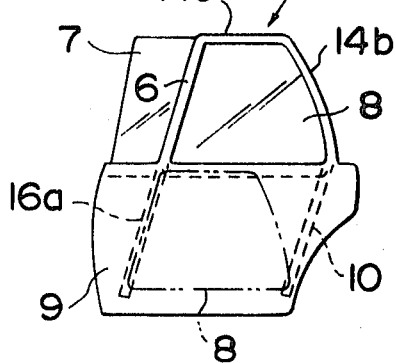

F I G. 11
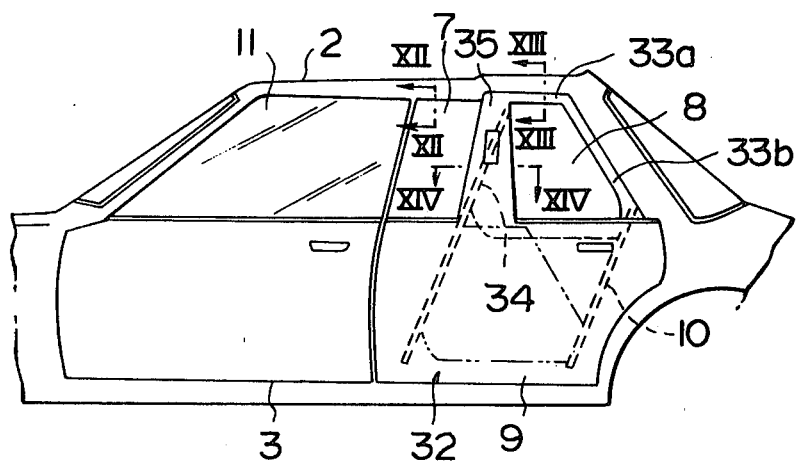
F I G. 12
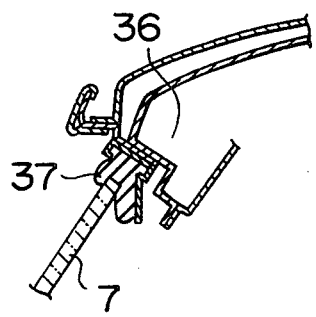
F I G. 13
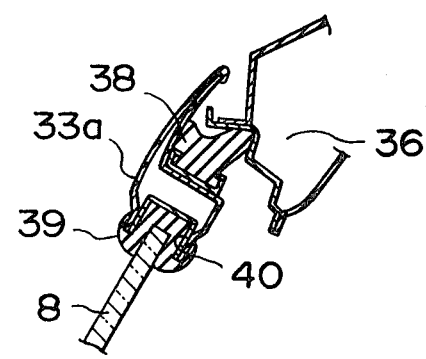
F I G. 14
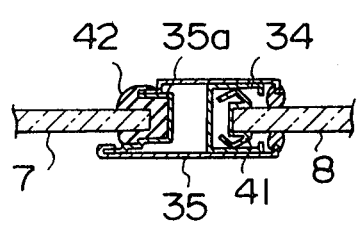
F I G. 15
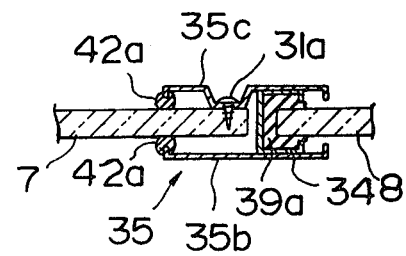

REAR SIDE DOOR STRUCTURE FOR FOUR-DOOR TYPE AUTOMOBILES

The present invention relates to four-door type automobiles having front and rear side doors, and more particularly to rear side door structures therefor. Throughout the specification, the word "four-door" type is used to mean such a type that has four side doors, namely, two front side doors and two rear side doors, and includes a so-called five-door type which has a back door in addition to the four side doors.

In a four-door type automobile, the rear side door is of such a configuration that has a cut-off at the rear lower corner portion thereof for relieving the rear tire house structure. Due to the specific configuration of the rear side door, there has been difficulties in retracting the door glass panel into the door structure. In order to overcome the difficulties, there has been proposed by Japanese utility model application No. Sho 51-148197 which has been filed on Nov. 4, 1976 and disclosed for public inspection on June 6, 1978 under the disclosure number of No. Sho 53-67217 a rear side door wherein the glass panel is divided into two parts so that the divided parts can be separately retracted. Similar structure is also disclosed by Japanese utility model application No. Sho 51-67325 which has been filed on May 25, 1976 and disclosed for public inspection on Dec. 1, 1977 under the disclosure number of No. Sho 52-158417. In this type of structures, however, disadvantages have been encountered in that a complicated mechanism is required in retracting the divided parts into the door structure. In Japanese utility model application No. Sho 51-96875 which has been filed on July 22, 1976 and disclosed for public inspection on Feb. 10, 1978 under the disclosure No. Sho 53-16221, there is also shown a rear side door structure wherein the glass panel is divided into two parts. In the proposed structure, the divided parts of the glass panel are respectively provided with actuating mechanisms. The structure is therefore inconvenient to operate because the divided glass panel parts must be individually actuated.

In another type of conventional rear side door structures, the glass panel is divided into a front and rear parts and only the front part is vertically retractable into the door structure while the rear part is immovably secured to the door structure. This type of door structure provides however the passenger in the rear seat with an uncomfortableness in that the part of the glass panel which is close to the rear seat passenger cannot be opened. Further, there is another type of rear side door structure which has a totally retractable glass panel. In this type of door structure, however, the transparent glass panel is of a relatively small width and of a relatively small height so as to make it possible to retract it into the door panel. Thus, the rear pillar of the automobile body becomes correspondingly wide and the lower hem of the door window opening becomes correspondingly high so that the comfortableness of the rear seat passenger is impaired. It is of course possible to provide the widened rear pillar with a transparent portion but such arrangement is not effective to improve the comfortability of the rear seat passenger.

It is therefore an object of the present invention to provide a rear side door structure for a four-door type automobile in which a sufficient window opening can be provided for a rear seat passenger.

A further object of the present invention is to provide a rear side door which can provide a rear seat passenger with a satisfactory comfortability by means of a retractable glass panel.

Another object of the present invention is to provide a rear side door structure having a novel glass panel actuating mechanism.

According to the present invention, the above and other objects can be accomplished by a rear side door structure comprising a door panel assembly having an upper hem for defining a lower edge of a window opening, guide means extending upwardly from said upper hem of the door panel assembly to divide the window opening into front and rear opening portions, a front transparent glass panel secured to the door panel assembly to cover said front opening portion, a rear transparent glass panel disposed movably along said guide means between a closed position wherein it covers the rear opening portion and an open position wherein it is retracted into said door panel assembly, said guide means being inclined rearwardly so that the rear transparent glass panel is moved forwardly as it is moved to the open position along the guide means. The front and rear opening portions of the window opening may be encircled by suitable sash members when the door is applied to a conventional sedan type automobile body. Where the front side door is of a sashless type wherein the door panel is not provided with sash members for the glass panel, the front opening portion of the window opening of the rear side door may not be provided with sash members so that the glass panel in the front side door and the front panel in the rear side door may be contiguous with a small clearance therebetween when the doors are closed. A weather seal member may be provided in the aforementioned clearance and may preferably be attached to the front glass panel in the rear side door.

In another aspect of the present invention, the guide means is provided at a lower portion thereof with engageable means and the rear glass panel is provided with cooperating engageable means so that, when the rear glass panel is moved downwardly by a predetermined distance, the engageable means in said guide means engages the cooperating engageable means in the rear glass panel so that a further movement of the rear glass panel causes a rotation thereof about said engageable means.

The above and other objects and features of the present invention will become apparent from the following descriptions of preferred embodiments taking reference to the accompanying drawings, in which;

FIG. 1 is a fragmentary side view showing an automobile body having a rear side door assembly in accordance with one embodiment of the present invention;

FIG. 2 is a side view of a rear side door assembly in accordance with another embodiment of the present invention;

FIG. 3 is a sectional view taken substantially along the line III—III in FIG. 2;

FIG. 4 is a side view of a rear side door assembly similar to FIG. 2 but showing a further embodiment;

FIG. 5 is a sectional view taken substantially along the line V—V in FIG. 4;

FIG. 6 is a side view similar to FIGS. 2 and 4 but showing a further embodiment;

FIG. 11 is a fragmentary side view of an automobile showing a further embodiment of the present invention;

FIG. 12 is a sectional view taken along the line XII—XII in FIG. 11;

FIG. 13 is a sectional view taken along the line XIII—XIII in FIG. 11;

FIG. 14 is a sectional view taken along the line XIV—XIV in FIG. 11;

FIG. 15 is a sectional view similar to FIG. 14 but showing a modification thereof;

Figure 7:
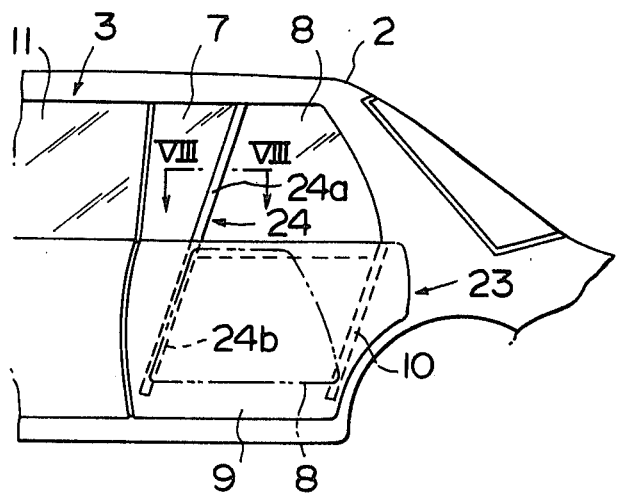
FIG. 7 is a fragmentary side view of an automobile similar to FIG. 1 but showing an embodiment wherein the present invention is applied to a "hard-top" type car.
Figure 8:
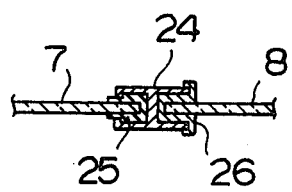
FIG. 8 is a sectional view taken substantially along the line VIII—VIII in FIG. 7.

Referring now to the drawings, particularly to FIG. 1, there is shown an automobile 1 having a four-door type body 2 provided with a front side door assembly 3 and a rear side door assembly 4. The rear side door assembly 4 is comprised of a door panel 9 to which a window frame or sash member 5 is attached to define a window opening. The door panel 9 has an upper hem 9a and a guide member 6 extends substantially vertically from the upper hem 9a throughout the height of the window opening to divide it into a front and rear openings 5a and 5b, respectively. In the front opening 5a, there is fitted a front window glass 7 so as to cover the opening 5a. In the rear opening 5b, there is provided a rear window glass 8. It will be noted in FIG. 1 that the guide member 6 is rearwardly inclined and has a lower portion 6a extending in the door panel 9. In the door panel 9, there is further provided a second guide member 10 which extends substantially along the rear edge of the door panel 9 in parallel with the lower portion 6a of the guide member 6. The rear window glass 8 is slidably engaged at its front edge with the guide member 6 and at its rear edge with the guide member 10 so that it can be moved between a closed position wherein it covers the rear window opening 5b as shown by solid lines in FIG. 1 and an open or retracted position as shown by phantom lines. Since the guide members 6 and 10 are inclined rearwardly, the glass 8 is moved forwardly when it is actuated toward the open position so that it is retracted into the door panel 9 without any interference with the rear edge of the door panel 9 even though the door panel is cut-off as shown by 9a to avoid the rear tire house in the body 2. A suitable mechanism (not shown) may be provided for actuating the window glass 8.

As in a conventional arrangement, the front side door assembly 3 is provided with a window glass 11 which is movable in a vertical direction as well known in the art. In the rear side door assembly 4, since the rear window glass 8 is forwardly moved when it is retracted into the door panel 9, it can be of a larger width so that a sufficient window opening can be provided for a passenger in the rear seat which is designated by the reference numeral 12.

Referring now to FIG. 2, there is shown another embodiment in which the door panel 9 is integrally provided with an window frame 14 which comprises a front frame portion 14a, a rear frame portion 14b and an upper frame portion 14c. A rearwardly inclined guide member 6 is provided to divide the window opening into a front and rear openings. As shown in FIG. 3, the guide member 6 is comprised of an inner plate 15 and an outer plate 16 which are spaced apart from each other. A front seal member 17 is provided between the inner and outer plates 15 and 16 along the front edges thereof and weather-tightly engaged with the rear edge of the front window glass 7. Between the inner and outer plates 15 and 16, there is provided a run-channel 18 which is adapted to guide the front edge of the rear window panel 8. Along the rear edges of the plates 15 and 16, there are provided sealing member 19. As shown by the reference 16a in FIG. 2, the run-channel 16 extends substantially downwardly into the door panel 9 to provide a front guide member for the front edge of the glass 8.

Referring to FIG. 4, there is shown a further embodiment of the present invention. This embodiment is different from the embodiment shown in FIGS. 2 and 3 in that the front frame portion 14a is omitted and the front edge of the front window glass 7 is exposed. The embodiment shown in FIG. 4 is suitable for use with a front side door assembly wherein no frame member is provided for the rear edge of the window glass 11. As shown in FIG. 5, a sealing strip 21 may be provided along the front edge of the glass 7. The sealing strip 21 has a sealing edge 21a which is adapted to be engaged with the rear edge of the glass 11 in the front side door assembly 3.

Referring now to FIG. 6, the embodiment shown therein includes a window frame provided only for the rear window glass 8. In this embodiment, the window frame is constituted by a guide member 6, a rear frame portion 14b and an upper frame portion 14c to define a window opening for the retractable window glass 8. The upper and front edges of the fixed window glass 7 are exposed. In other respects, the arrangements are substantially the same as in the embodiment shown in FIG. 4.

In the embodiment shown in FIG. 7, no window frame is provided in both the front and rear side door assemblies 3 and 23. In this embodiment, the rear side door assembly 23 has a door panel 9 provided with a rearwardly inclined guide member 24 including an upper portion 24a which extends substantially upwardly from the door panel 9 and a lower portion 24b extending in the door panel 9. In the door panel 9, there is also provided a second guide member 10 which is in parallel with the guide member 24 and extends substantially along the rear edge of the door panel 9. The guide member 24 is of a substantially H-shaped cross-sectional configuration which is attached along its forward edge portion with the rear edge of the fixed front window glass 7 with an intervention of a seal member 25. Along the rear edge portion of the guide member 24, there is provided a run-channel 26 with which the front edge of the rear window glass 8 is slidably engaged. The front edge of the fixed window glass 7 is adapted to be placed along the rear edge of the glass 11 in the front side door assembly 3 with a slight clearance therebetween. A sealing member may be provided along the front edge of the glass 7 as in the example shown in FIG. 5.

Figure 9:
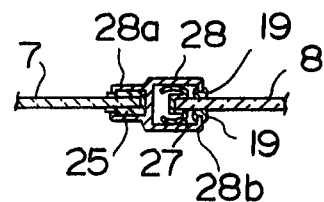
FIG. 9 is a sectional view similar to FIG. 8 but showing a modified form.

FIG. 9 shows an alternative form of the guide member which is designated in this embodiment by the reference numeral 28. The guide member 28 has a front channel portion 28a to which the rear edge of the front window glass 7 is fitted with an intervention of a sealing member 25 therebetween. The guide member 28 further has a rear channel portion 28b which is adapted for a slidable engagement with guide shoes 27 provided at the front edge of the rear window panel 8. As in the arrangement of FIG. 3, sealing members 19 may be provided between the guide member 28 and the glass 8.

Figure 10:
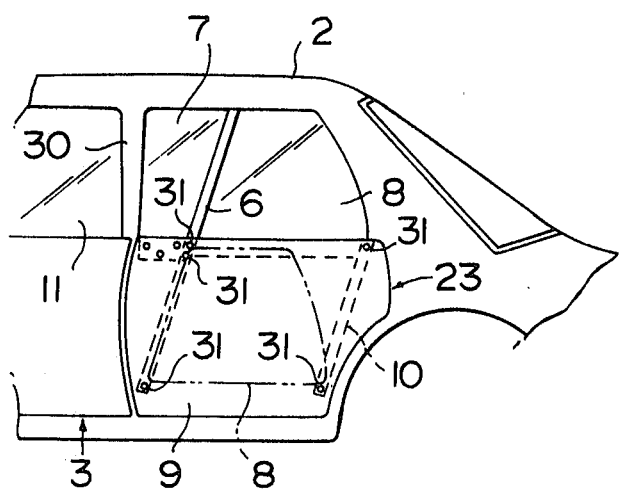
FIG. 10 is a fragmentary side view of an automobile similar to FIG. 7 but showing a further embodiment of the present invention.

In the embodiment shown in FIG. 10, the rear side door assembly 23 may be similar to that shown in FIG. 7. In this embodiment, however, the body 2 is provided with a center pillar 30. As shown in FIG. 10, the glass 7 may be secured to the guide member 24 by an adhesive and to the door panel 9 by means of bolts 31. Further, the guide members 10 and 24 may be secured to the door panel 9 by means of bolts 31.

Referring to FIG. 11, the embodiment shown therein includes a rear side door assembly 32 which includes a door panel 9 integrally formed with a window frame comprised of an upper frame portion 33a, a rear frame portion 33b and a front frame portion 35 to define a window opening for the rear window glass 8. In front of the front frame portion 35, the door panel 9 is fitted with a front window glass 7. As in the embodiment of FIG. 6, the upper and front edges of the glass 7 are exposed. The door panel 9 is further provided with a rearwardly inclined guide member 34 which extends substantially throughout the heights of the front frame portion 35 and the door panel 9. A second guide member 10 is provided in parallel with the guide member 34 and substantially along the rear edge of the door panel. Thus, the rear window panel 8 is slidably guided by the guide members 34 and 10.

As shown in FIG. 12, the body 2 is provided along the upper edge portion 36 of the rear side door opening with a weather strip 37 so that the upper edge of the glass 7 is weather-tightly engaged with the weather strip 37. Referring to FIG. 13, it will be noted that the upper frame portion 33a of the rear side door assembly 32 is provided along the lower edge with a downwardly opened groove 40 to which a guide channel 39 is fitted for engagement with the upper edge of the rear window glass 8. Referring to FIG. 14, there is shown a horizontal section of the front frame portion 35. In FIG. 14, it will be noted that the front frame portion 35 is fitted with a channel member 35a to which the rear edge of the glass 7 is fitted through a seal member 42. The guide member 34 is of a channel shaped cross-section to which sliding shoes 41 of a synthetic material on the front edge of the glass 8 are slidably engaged.

FIG. 15 shows a modification of the structure shown in FIG. 14. In this modification, the front frame portion 35 comprises an outer panel 35b and an inner panel 35c, and the guide member 34 is disposed between the panels 35b and 35c. The rear edge of the front glass 7 is secured to the inner plate 35c by means of screws 31a. Sealing members 42a may be provided between the glass 7 and the plates 35b and 35c. In the guide member 34, there is disposed a run-channel 39a which slidably receives the front edge of the rear window glass 8.

Figure 16:
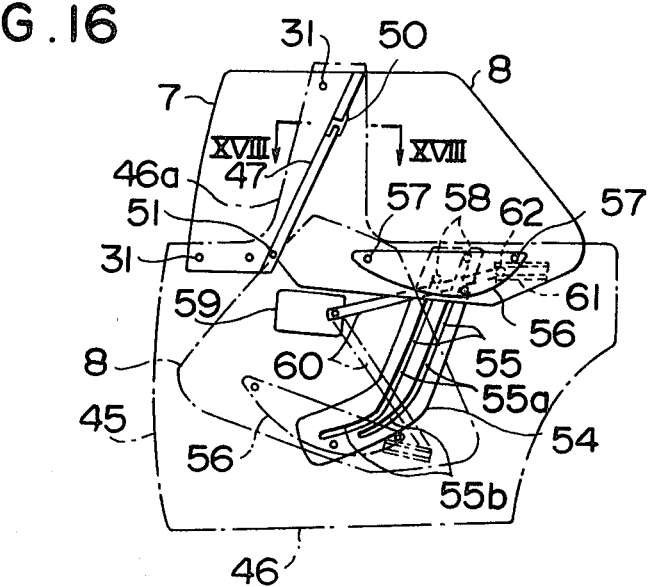
FIG. 16 is a side view showing an example of glass actuating mechanism.
Figure 18:
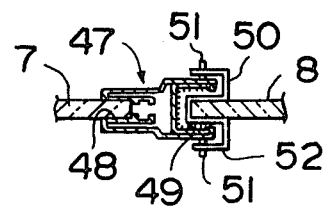
FIG. 18 is a sectional view taken along the line XVIII—XVIII in FIG. 16.

Referring now to FIG. 16, the rear side door assembly 45 includes a door panel 46 which is provided with a rearwardly inclined guide member 47 extending substantially upwardly from the door panel 46. The door panel 46 is integrally formed with an upwardly extending cover 46a which is adapted to cover the guide member 47. A front window glass 7 is secured at the lower edge portion to the door panel 46 by means of screws 31. As shown in FIG. 18, the guide member 47 has a groove 48 formed along the front edge thereof, and the rear edge of the glass 7 is received in the groove 48 and secured to the guide member 47 by means of screws 31. The guide member 47 is further formed along its rear edge with a guide channel 49. At the front edge of the rear window glass 8, there is provided a sliding shoe 50 which is adapted to slide along the guide channel 49.

Figure 17:
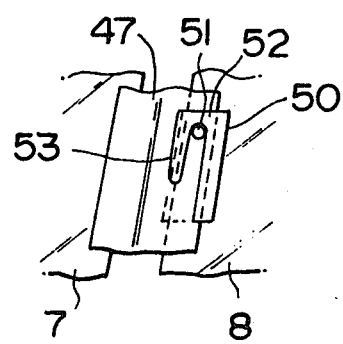
FIG. 17 is an enlarged fragmentary view showing the hook device adopted in the mechanism shown in FIG. 16.

As shown in FIGS. 16 through 18, the guide member 47 is provided at the lower end portion thereof with a pair of axially aligned pins 51 which extend sidewardly from the opposite side surfaces of the guide member 47. The sliding shoe 50 has a pair of side arms 52 which are disposed adjacent to the opposite side surfaces of the guide member 47 and formed with hook portions 53. It should therefore be understood that, when the glass 8 is moved downwardly along the guide member 47, the hook portions 53 eventually come into engagement with the pins 51 so that the front edge of the glass 8 is restricted from the downward movement. Thus, a further movement of the glass 8 causes a rotation thereof about the pins 51.

In FIG. 16, it will further be noted that the door panel 46 is provided with a second guide member 54 having a pair of guide grooves 55. The grooves 55 include upper straight portions 55a and arcuated lower portions 55b. The glass 8 has a bracket 56 which is secured to the lower edge portion thereof by means of screws 57. The bracket 56 carries a pair of guide rollers 58 which are adapted to be engaged with the guide grooves 55. On the door panel 46, there is also provided a window regulator 59 which has an actuating arm 60 having a free end engaged with a guide rail 61 on the glass 8 through a roller 62. Thus, in the arrangement, when the regulator 59 is actuated to retract the rear window glass 8, the glass 8 is at first moved forward and downwardly along the rearwardly inclined guide member 47 and the upper straight portions 55a of the guide grooves 55 until the hook portions 53 of the sliding shoes 50 engage the pins 51 on the guide member 47. When the actuation of the regulator 59 is continued, the glass 8 is rotated about the pins 51 with the guide rollers 58 moved along the arcuated portions 55b of the guide grooves 55. The arrangements provide a smooth and reliable movement of the rear window glass 8 and make it possible to retract the glass 8 completely into the door panel 46.

Figure 19:
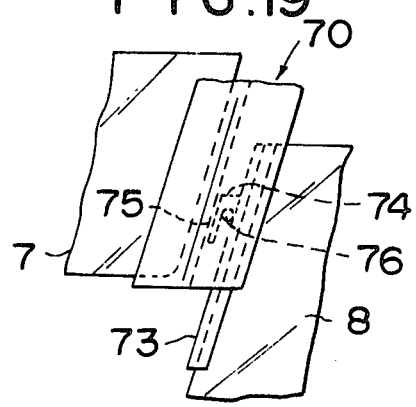
FIG. 19 is a fragmentary side view in an enlarged scale showing a modified hook device; and, FIG. 20 is a sectional view similar to FIG. 18 but showing the modification in FIG. 19.
Figure 20:
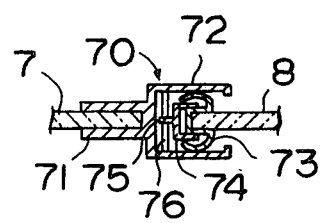

FIGS. 19 and 20 show an alternate form of the guide member. In this example, the guide member 70 includes a groove 71 formed along the front edge thereof and the rear edge of the front window glass 7 is fitted to the groove 71. The guide member 70 is further formed with a rearwardly opened guide channel 72 which is adapted to receive a sliding shoe 73 provided on the front edge of the glass 8. The sliding shoe 73 is secured to the front edge of the glass 8 by means of a retaining fitting 74 which is formed at the front portion thereof with a hook 75. In the guide channel 72 of the guide member 70, there is provided a pin 76 for engagement with the hook 75.

The invention has thus been shown and described with reference to specific embodiments, however, it should be noted that the invention is in no way limited to the details of the illustrated structures but changes and modifications may be made without departing from the scope of the appended claims.

We claim:

1. Rear side door structure comprising a door panel assembly having an upper hem for defining a lower edge of a window opening and a tire house relief cutout formed at rear corner portion, guide means extending upwardly from said upper hem of the door panel assembly to divide the window opening into a front and rear opening portions, a front transparent glass panel secured to the door panel assembly to cover said front opening portion, a rear transparent glass panel disposed movably along said guide means between a closed position wherein it covers the rear opening portion and an open position wherein it is retracted into said door panel assembly, said guide means being inclined rearwardly so that the rear transparent glass panel is moved forwardly as it is moved downwardly to the open position along the guide means whereby the glass panel is retracted into said door panel assembly forwardly of said tire house relief cutout.

2. Rear side door structure in accordance with claim 1 in which window frame means is provided around said window opening and said rear opening portion has a greater area than the front opening portion.

3. Rear side door structure in accordance with claim 1 which is adapted to be used with a sashless type front side door structure provided with a front side door glass panel having an exposed rear edge, wherein at least front edge of said front transparent glass panel of the rear side door structure is free of sash means so that it can be placed adjacent to the rear edge of the front side door glass panel with a small clearance therebetween, seal means being provided along said clearance.

4. Rear side door structure in accordance with claim 3 in which said seal means is provided on the front transparent glass panel along the front edge thereof.

5. Rear side door structure in accordance with claim 3 in which window frame means is provided around said rear opening portion.

6. Rear side door structure in accordance with claim 3 in which window frame means is provided except along the front edge of the front transparent glass panel.

7. Rear side door structure in accordance with claim 3 in which said guide means is provided with engageable means and said rear transparent glass panel with cooperating engageable means at its front edge whereby, when the rear transparent glass panel is moved forwardly and downwardly along said guide means beyond a position wherein the engageable means on the rear glass panel engages the engageable means on the guide means, the rear glass panel is rotated forwardly about the engageable means.

* * * * *